March 3, 1953

J. W. BERG 2,630,350

MATERIAL HANDLING EQUIPMENT

Filed Sept. 21, 1949

INVENTOR.
John W. Berg
BY
ATTORNEY.

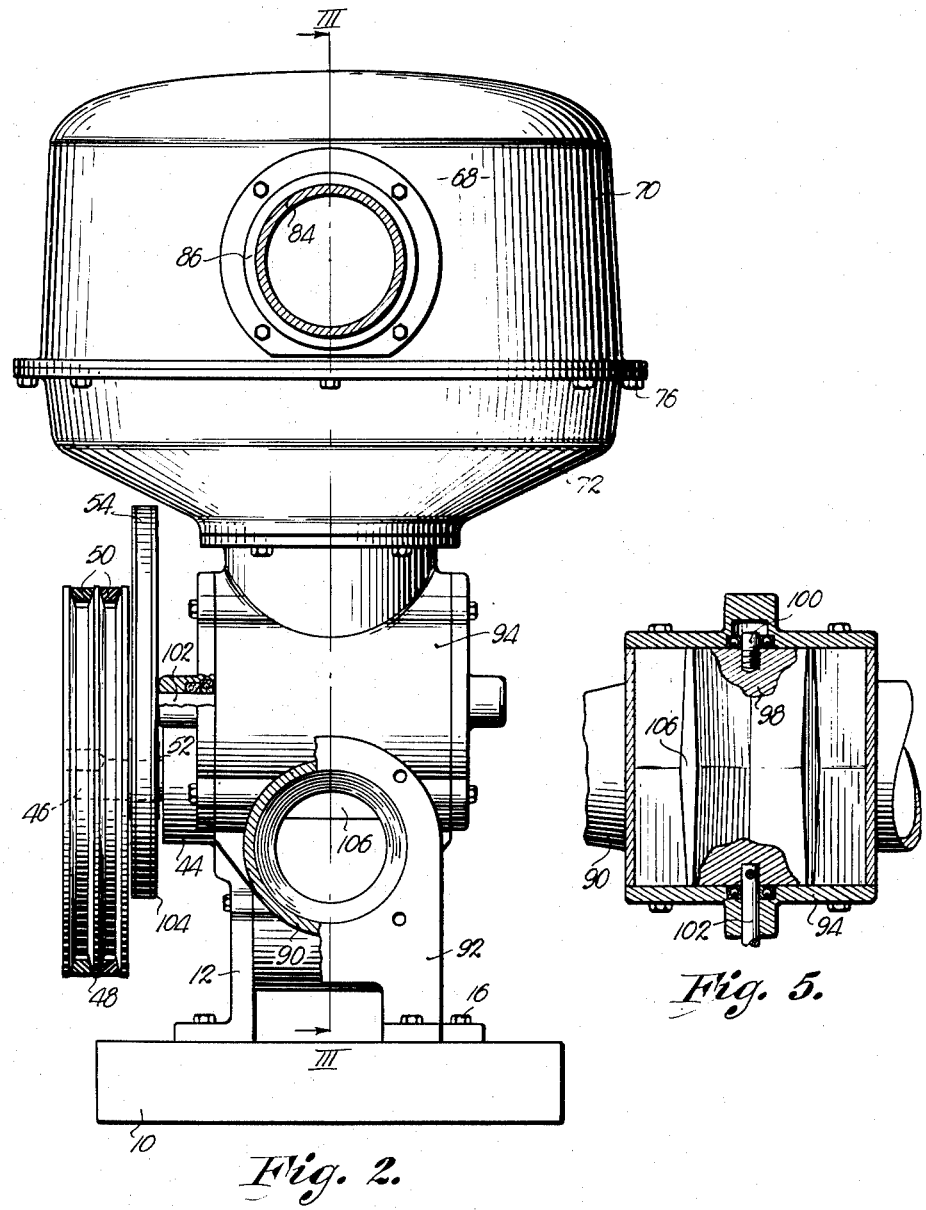

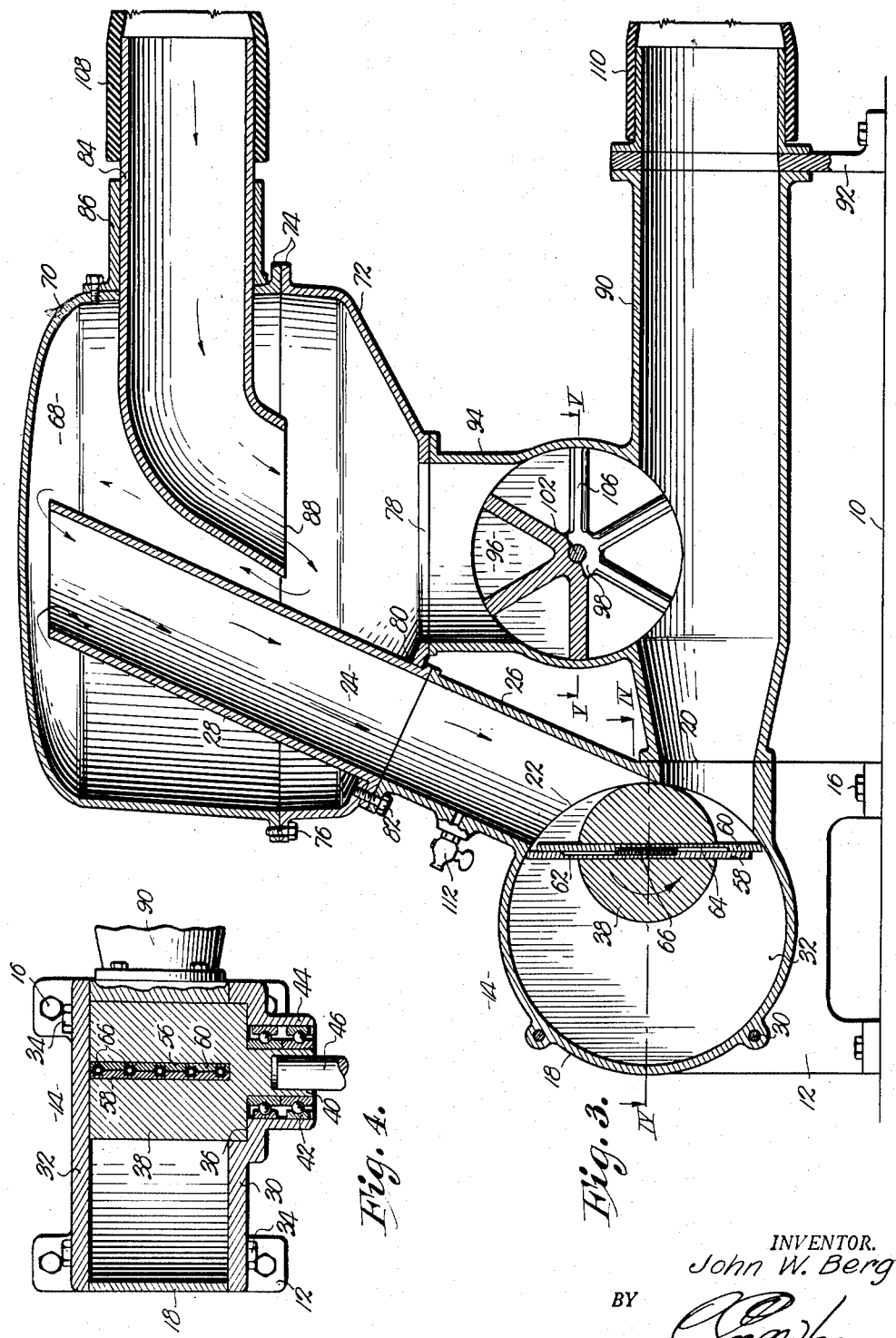

Patented Mar. 3, 1953

2,630,350

UNITED STATES PATENT OFFICE 2,630,350

MATERIAL HANDLING EQUIPMENT

John W. Berg, Hutchinson, Kans.

Application September 21, 1949, Serial No. 117,043

1 Claim. (Cl. 302—23)

This invention relates to machines for handling grain and other materials including a novel pump construction and arrangement of component parts to transfer or convey materials from one point to another pneumatically and in a manner to eliminate damage to the materials being handled as is common among conventional machines of this character.

It is the primary object of the present invention to provide a materials conveyor having a pump provided with a suction conduit and an exhaust conduit, together with a hollow body or hopper for receiving the materials as the same are drawn into the body by suction created in the pump, there being means provided to feed such materials from the hollow body to the exhaust conduit of the pump.

The most important object of the present invention is to provide a materials conveyor wherein both the suction and exhaust ports or conduits of the pump are utilized in moving the materials from one point to another.

Another important object of the present invention is to provide a materials conveyor having a hollow body or hopper and a suction pump wherein the suction line of the pump extends into the body and terminates above a passageway for the materials whereby, as the material enters the hopper the same falls thereinto by force of gravity and is not transferred to the pump through its suction line.

Another object of the present invention is to provide means to feed the conveyed material from the hopper to the exhaust line of the pump while maintaining the hopper closed at all times.

A further object of the present invention is to provide a more efficient pump construction for material conveyors wherein is included an eccentric rotor having floating vanes that are held against the inner walls of the pump housing by spring means and by centrifugal force.

Other more minor objects will be made clear or become apparent as the following specification progresses, reference being had to the accompanying drawings, wherein:

Fig. 2 is an end elevational view thereof taken through the inlet and outlet conduits therefor.

Fig. 3 is a vertical, central, cross-sectional view taken on line III—III of Fig. 2 looking in the direction of the arrows.

Fig. 4 is a detailed, fragmentary, cross-sectional view taken on line IV—IV of Fig. 3 looking in the direction of the arrows; and Fig. 5 is a transverse, detailed, cross-sectional view taken on line V—V of Fig. 3 showing the top plan view of the rotor thereof.

Figure 1:
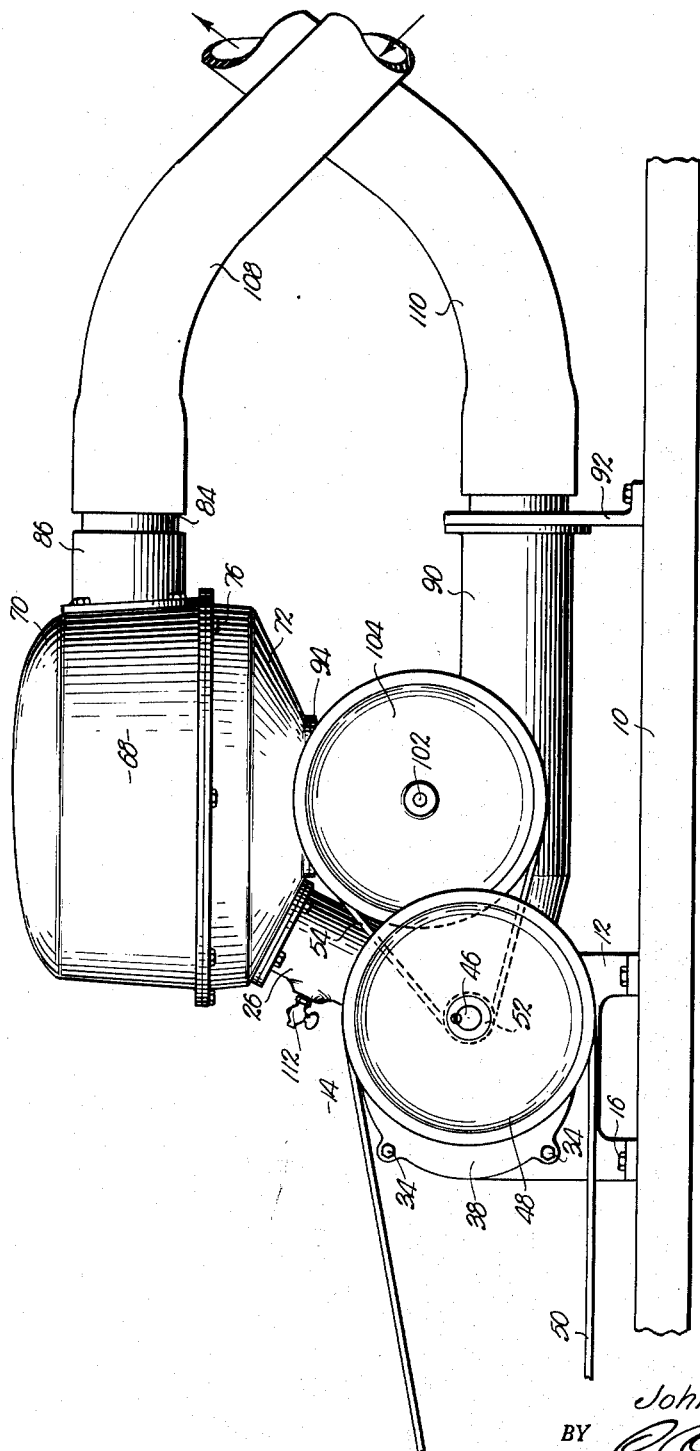
Fig. 1 is a side elevational view of a materials handling equipment made in accordance with the present invention.

As above mentioned, materials handling equipment of conventional character for conveying farm grains and the like, are for the most part unsatisfactory because of the power required to move the same, the expense of manufacture of the component parts thereof as well as bulkiness, and more important because of the fact that the materials are seriously damaged through the handling thereof. As will hereinafter appear, all of the above disadvantages are eliminated in the equipment forming the subject matter hereof. The motivating means utilized is entirely pneumatic and utilization is made of both the suction and exhaust ports of a pump in causing the grain movement.

The entire machine may be conveniently mounted upon a suitable supporting base 10 and includes a standard 12 for a pump broadly designated by the numeral 14, standard 12 being secured rigidly to base 10 through the medium of bolts or the like 16.

The pump 14 includes a cylindrical housing 18 having its axis disposed substantially horizontally. Housing 18 is provided with a tangential exhaust port 20 that has its axis horizontal and substantially perpendicular to the axis of housing 18. Housing 18 is also provided with a suction port 22 disposed above the exhaust port 20 that registers with a sectional conduit broadly designated by the numeral 24 and having a pair of sections 26 and 28. The longitudinal axis of the conduit 24 is tangential to the housing 18 and extends upwardly at an angle with respect to the vertical.

Section 26 of the suction conduit 24 may well be cast or otherwise formed integrally with the housing 18 as illustrated. The vertical walls of the housing 18 takes the form of substantially circular plates 30 and 32 that are removably mounted upon the housing 18 through the medium of bolts or the like 34.

The innermost face of the plate 30 of housing 18 is provided with a circular, eccentrically disposed cavity 36 for receiving one end of a drum 38 mounted within the housing 18 and extending between the walls 30 and 32 thereof. That end of the drum 38 adjacent wall 30 has a concentric, outwardly extending hub 40 that passes through bearings 42 mounted within a tubular outwardly extending box 44 integral with the plate 30.

Hub 40 receives a drive shaft 46. The shaft 46 has a relatively large pulley 48 thereon for receiving belts 50 that extend to a drive pulley forming a part of any suitable prime mover not shown. Shaft 46 also has a relatively small sheave 52 thereon for receiving a belt 54 for purposes hereinafter to be more fully described.

The drum 38 has a transverse slot 56 formed therein for receiving a pair of plate-like vanes 58 and 60. The combined thicknesses of the plates 58 and 60 are substantially the same as the width of the slot 56 but such vanes 58 and 60 are freely slidable within slot 56 radially with respect to drum 38.

The proximal faces of the plates 58 and 60 are slidably interengaging and have a plurality of complementary registering cavities 62 and 64 respectively formed therein. The ends of the cavities 62 and 64 present shoulders for receiving adjacent ends of corresponding coil springs 66. In other words, there is a coil spring 66 for each of the registering cavities 62 and 64 that tend to urge both plates 58 and 60 outwardly with respect to the axis of drum 38. Thus, when the drum 38 is in the position illustrated in Fig. 3, one outermost edge of the plate 58 and the opposite outermost edge of the plate 60, is in engagement with the innermost surface of drum 18 and these edges are held in such position by the plurality of springs 66. As the drum 38 is caused to rotate in the direction of the arrow indicated in Fig. 3 through the belt 50, pulley 48 and shaft 46, springs 66 will hold plates 58 and 60 against the inner surface of cylinder 18 until such time as centrifugal force shifts the plates 58 and 60 in one direction to maintain one edge of plate 58 in sliding contact with the housing 18. As drum 38 continues to rotate, such centrifugal force will move the plates 58 and 60 in the opposite direction and thereby move the opposite edge of plate 60 into sliding contact with cylinder 18.

A hollow housing or hopper, broadly designated by the numeral 68, includes a pair of sections 70 and 72 removably interconnected through the medium of abutting flanges 74 and connecting bolts 76. The section 72 is funnel-shape and provided with an outlet opening 78 in the bottom thereof and a port 80 disposed along one side of the outlet 78.

The sections 26 and 28 of suction conduit 24 are interconnected by bolts 82 adjacent the port 80, section 28 passing through port 80 and terminating in an open end adjacent to and spaced slightly below the uppermost surface of section 70 of hopper 68.

A materials passage way includes a substantially L-shaped pipe 84 that extends into the section 70 of hopper 68 preferably for sliding movement within a collar 86 secured to the hopper 68. A pipe section 84 is provided with a downwardly extending outlet opening 88 that is preferably adjacent the joint between sections 70 and 72 and well below the uppermost end of the suction conduit 24 as is clear in Fig. 3.

An elongated, substantially horizontal exhaust conduit 90 is disposed below the hopper 68 in registering relationship at one end thereof with the exhaust port 20 of pump 14 and has its outermost end supported by an upstanding bracket 92 on base 10. Exhaust 90 has a tubular housing 94 registering therewith and extending upwardly for connection with the housing 68 in registering relationship with outlet 78.

Housing 94 is provided with a rotor 96 that includes a hub 98 having opposed pintles 100 and 102 mounted within the housing 94. The pintle 102 extends outwardly beyond the housing 94 and receives a sheave 104 that is operably connected with the sheave 52 through the medium of the belt 54.

Rotor 96 is also provided with a plurality of radial vanes 106. The vanes 106 extend entirely across the housing 94 and have their faces tapered as illustrated in Fig. 5, the greatest thickness of the vanes 106 being at the center thereof and the faces each converging as the outermost edges of the vanes are approached.

A pair of preferably flexible conduits 108 and 110 are joined with the pipe 84 and the exhaust conduit 90 respectively in any suitable manner not shown. The conduit 108 leads from the source of materials to be conveyed, while the conduit 110 may be extended to a point of discharge. In this connection and for illustration only, conduit 108 may well extend into a truck filled with materials to be handled while the conduit 110 projects to a storage bin therefor.

In operation, it is seen that a single prime mover (not shown) may be utilized to drive the drum 38 of pump 14 as well as the rotor 96. The direction of rotor 96 is immaterial but as arranged, the same will move in the same direction as drum 38 as indicated by the arrow in Fig. 3. Rotation of the drum 38 and constant contact of the inner surfaces of cylinder 18 by the plates or vanes 58 and 60, will create suction in the conduit 24 that is exhausted through the conduit 90. The housing 68 is completely sealed and therefore, the suction in conduit 24 will also exist within the housing 68. Such suction serves to draw the materials through conduit 108 and the pipe 84 for discharge into hopper 68. As soon as the materials reach the outlet 88 of pipe 84, the same will drop by gravity into hopper 68 through outlet 78 and upon the rotor 96. Because of the constant rotation of rotor 96, such materials will thereupon be conveyed from the housing 94 into the exhaust conduit 90 whereupon the pressure exerted by pump 14 will continue movement of the materials through conduit 90 and into the conduit 110 for ultimate discharge into a bin or other desired point.

It is seen that the rotor 96 serves as a feeding means for the materials from the hopper 68 to the exhaust conduit 90 and that inasmuch as the outermost edges of the vanes 106 are constantly in engagement with the walls of housing 94, hopper 68 will remain closed at all times. Suction within the conduit 24 will not be present in the exhaust conduit 90 beyond the feeding means 96 and in the same manner the pressure exerted by pump 14 within exhaust conduit 90 will not reach the hopper 68.

It is also seen that by disposing the uppermost end of the exhaust conduit 24 well above the outlet 88 of pipe 84, the materials will not move upwardly within housing 68 for movement into conduit 24. Instead, the action of gravity will cause such materials to fall downwardly from outlet 88 into the housing 94.

A pet cock type vent 112 is provided in the suction line 24 for admission of selected amounts of air into such line 24, dependent of course, upon the condition of the grain and ease of movement thereof. Normally, pet cock 112 will be open whereby to permit a relatively small amount of air to enter the suction line 24 thereby increasing the amount of air that passes into the exhaust conduit 90 in comparison with the air flow in conduit 24. It is seen that because of the relatively large cross-sectional area of the hopper 68, the velocity of the air in outlet 88 will be relatively high as compared with the air velocity in hopper 68, and such condition, together with the action of gravity, will cause the material to enter the housing 94 rather than pass into the suction conduit 24. With respect to the pump 14 through the construction thereof shown and described, a relatively small pump is needed to move a comparatively large volume of grain or other materials.

Pump 14 is extremely simple and inexpensive to manufacture and is devoid of complicated and expensive parts. The entire machine is relatively small and compact and has proved to be extremely efficient in operation from the standpoint of moving a large volume of grain in a relatively short period of time without damage thereto and without operational difficulties.

With respect to gate or rotor 96, it is apparent that vanes 106 may vary in shape as desired, the important factor being prevention of air movement to or from hopper 68 as much as possible while maintaining the pockets between vanes 106 sufficiently large to handle the grain delivery from opening 88.

Manifestly, changes and modifications might well be made and it is, therefore, desired to be limited only by the spirit of this invention as defined by the scope of the appended claim.

Having thus described the invention, what is claimed as new and desired to be secured by Letters Patent is:

For use with a pneumatic pump of the kind having a housing provided with a cylindrical wall, said wall having a horizontal axis, an inlet opening and an outlet opening next adjacent the inlet opening, an elongated, horizontal discharge pipe registering with said outlet opening and disposed tangentially to said cylindrical wall, a vacuum chamber having a side wall and a bottom, said bottom having an outlet tube communicating at the lowermost end thereof with said discharge pipe at the top of the latter, and a rotatable feeder in said tube disposed entirely above the longitudinal, horizontal axis of said pipe for receiving material from said chamber and feeding the same to the discharge pipe by force of gravity, the improvement of which comprises an L-shaped material conduit having a horizontal leg extending into the chamber through said side wall and down-turned leg within the chamber provided with a discharge end disposed above said tube and facing downwardly toward the feeder; and an elongated intake pipe having an inclined longitudinal axis, communicating with said inlet opening, disposed tangentially to said cylindrical wall, extending into the chamber through said bottom wall and terminating within said chamber in an upwardly-facing inlet end disposed above said conduit, the axis of rotation of the feeder being horizontal and in parallelism with the transverse axis of the discharge pipe.

JOHN W. BERG.

REFERENCES CITED

The following references are of record in the file of this patent:

UNITED STATES PATENTS

| Number | Name | Date |
|---|---|---|
| 138,175 | Merrill | Apr. 22, 1873 |
| 585,804 | Weber | July 6, 1897 |
| 636,670 | Jones | Nov. 7, 1899 |
| 1,173,073 | Williams | Feb. 22, 1916 |
| 1,283,089 | Connor | Oct. 29, 1918 |
| 1,434,716 | Marion | Nov. 7, 1922 |
| 1,605,196 | Ligon | Nov. 2, 1926 |
| 2,312,961 | Cowherd | Nov. 8, 1939 |

FOREIGN PATENTS

| Number | Country | Date |
|---|---|---|
| 16,914 | Germany | Feb. 13, 1882 |
| 6,449 | Great Britain | of 1885 |
| 11,990 | Great Britain | of 1912 |
| 122,353 | Great Britain | Jan. 23, 1919 |
| 113,694 | Australia | Aug. 15, 1941 |